(12) United States Patent
Steenbakkers et al.

(10) Patent No.: US 7,470,367 B2
(45) Date of Patent: Dec. 30, 2008

(54) PROCESS FOR REMOVING A CONTAMINANT FROM CONTAMINATED GROUNDWATER

(75) Inventors: Laurentinus Wilhelmus Steenbakkers, Susteren (NL); Martin Willem Jozef Plum, Landgraaf (NL); Dominicus Richardus Johannes Grootjen, Sittard (NL)

(73) Assignee: Terreco Holding B.V., Geleen (NL)

( * ) Notice: Subject to any disclaimer, the term of this patent is extended or adjusted under 35 U.S.C. 154(b) by 0 days.

(21) Appl. No.: 10/582,991

(22) PCT Filed: Dec. 16, 2004

(86) PCT No.: PCT/NL2004/000879

§ 371 (c)(1),
(2), (4) Date: Jul. 16, 2007

(87) PCT Pub. No.: WO2005/058515

PCT Pub. Date: Jun. 30, 2005

(65) Prior Publication Data

US 2007/0272611 A1 Nov. 29, 2007

(30) Foreign Application Priority Data

Dec. 19, 2003 (NL) .................................. 1025075

(51) Int. Cl.
*C02F 3/00* (2006.01)

(52) U.S. Cl. ...................... 210/610; 210/615; 210/616; 210/903; 210/170.07

(58) Field of Classification Search .................. 435/262; 210/620, 170.07, 610, 150–151, 903, 615–616
See application file for complete search history.

(56) References Cited

U.S. PATENT DOCUMENTS

| 4,990,031 | A | | 2/1991 | Blowes et al. | |
| 5,057,227 | A | | 10/1991 | Cohen | |
| 5,874,291 | A | * | 2/1999 | Bielefeldt et al. | 435/262 |
| 6,203,703 | B1 | | 3/2001 | Yerushalmi et al. | |
| 6,280,625 | B1 | * | 8/2001 | Jackson et al. | 210/617 |
| 6,337,019 | B1 | * | 1/2002 | Razavi-Shirazi | 210/610 |
| 6,370,946 | B1 | * | 4/2002 | Lacey et al. | 73/61.62 |
| 7,045,339 | B2 | * | 5/2006 | Sorenson et al. | 435/262.5 |
| 2007/0218540 | A1 | * | 9/2007 | Guiot et al. | 435/262.5 |

FOREIGN PATENT DOCUMENTS

| DE | 40 40 838 | 7/1991 |
| DE | 198 36 240 | 2/1999 |

* cited by examiner

*Primary Examiner*—Chester T Barry
(74) *Attorney, Agent, or Firm*—Nixon & Vanderhye P.C.

(57) ABSTRACT

The invention relates to a process for removing a contaminant from groundwater wherein it is not necessary for groundwater to be extracted from the soil. To that end, the process according to the invention comprises the following steps: a) a biologically active layer (2) is applied on or in the soil b) the contaminated groundwater is contacted with the biologically active layer (2). The contaminant is converted in the biologically active layer. The biologically active layer (2) may be applied discontinuously. The contaminated groundwater may be contacted with the biologically active layer with the aid of for example a gas.

12 Claims, 2 Drawing Sheets

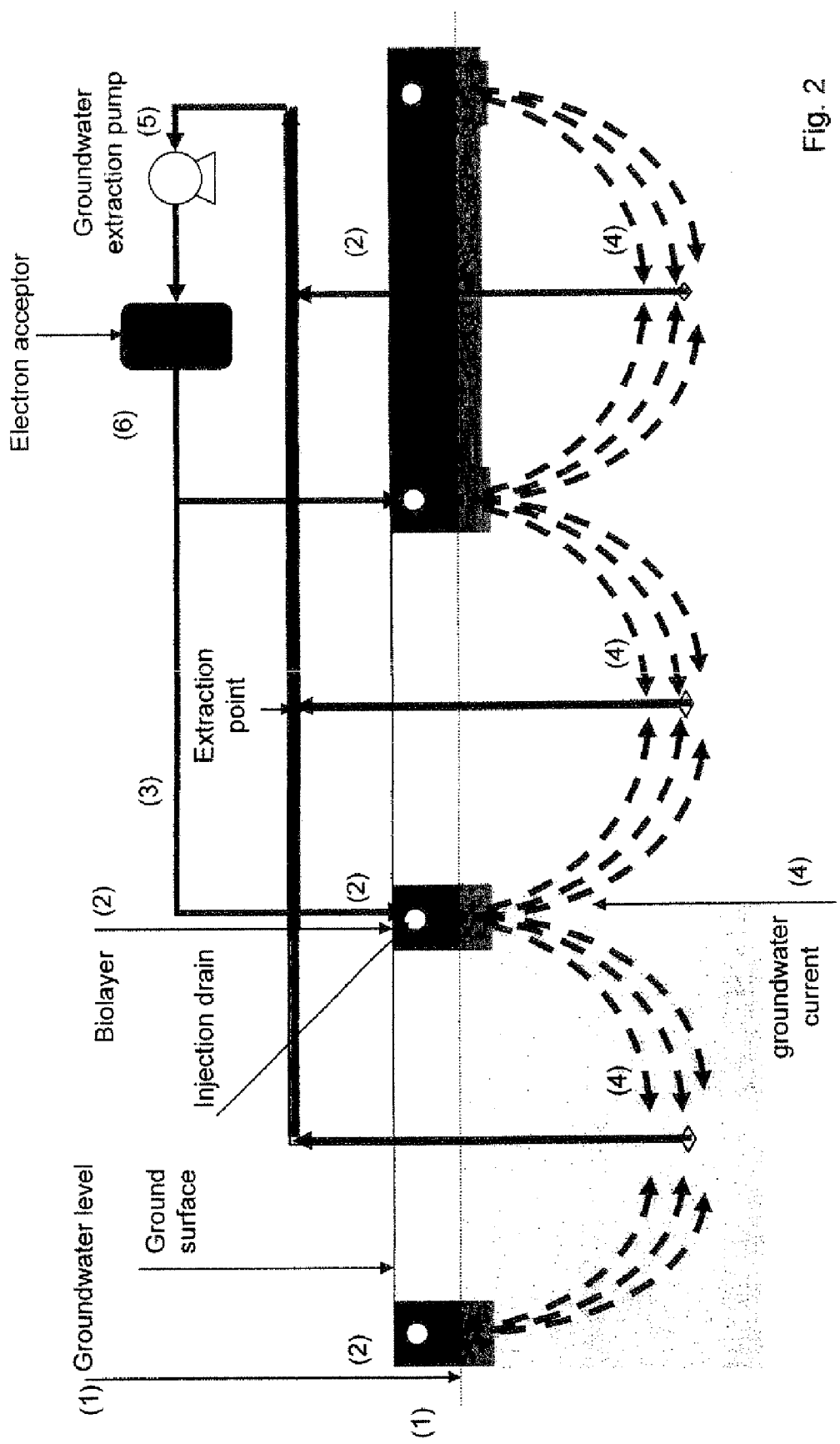

PROCESS FOR REMOVING A CONTAMINANT FROM CONTAMINATED GROUNDWATER

This application is the U.S. national phase of international application PCT/NL2004/1000879 filed 16 Dec. 2004 which designated the U.S. and claims benefit of NL 1025075, dated 19 Dec. 2003, the entire content of which is hereby incorporated by reference.

Processes for removing a contaminant from groundwater are known. An example is the so-called "Pump and Treat" process, whereby the contaminated groundwater is pumped up from the soil, whereupon the contaminated water is cleaned up aboveground.

A drawback of this process is ex-situ treatment of the extracted groundwater. This leads to relatively high costs and a system that is difficult of control. In addition, waste is generated and air pollution may occur. Other possible drawbacks are that groundwater extraction is not always possible, for example because of drying of the soil or subsidence or that in extracting groundwater the groundwater level is lowered, resulting in enlargement of the so-called smear zone. The smear zone is the area in the soil that has been in contact with the contaminated groundwater or a supernatant on the groundwater but where there is no longer any groundwater or supernatant layer present. Smear zones develop as a result of groundwater level fluctuations. Given that the soil in the smear zone has been in contact with the groundwater or supernatant, the smear zone, if the groundwater was contaminated, will also contain contaminants. However, since groundwater is no longer present, the smear zone cannot be cleaned up by a technique whereby the contaminated groundwater is pumped up to the surface. When the smear zone comes into contact with pure water, for example as a result of variations in the groundwater level or infiltration (for example by rainwater), a new solubility equilibrium will be established, with a proportion of the contaminants present in the smear zone entering the groundwater. This leads to prolonged remediation operations.

Another drawback of the Pump and Treat technique is that in using it clogging often occurs due to for example oxidation and precipitation of hitherto dissolved iron. Biological clogging also occurs often or fine particles accumulate within the extraction pipe.

The object of the invention is to provide a process for removing a contaminant from groundwater whereby it is not necessary for groundwater to be extracted from the soil.

This object is achieved by the process according to the invention.

The process according to the invention is a process for removing a contaminant from contaminated groundwater, which process comprises the following steps:
 a) a biologically active layer is applied on or in the soil
 b) the contaminated groundwater is contacted with the biologically active layer.

The contaminant is converted within the biologically active layer.

BRIEF DESCRIPTION OF THE DRAWINGS

FIG. 2 is a schematic illustration of an embodiment of a denitrification process which includes pumping up nitrate-bearing groundwater by pipes through which nitrification phase air was injected and adding an electron acceptor to the nitrate-bearing water above ground, whereupon the nitrate-bearing water is pumped onto the biologically active layer to cause conversion of nitrate to $N_2$.

Figure 1:
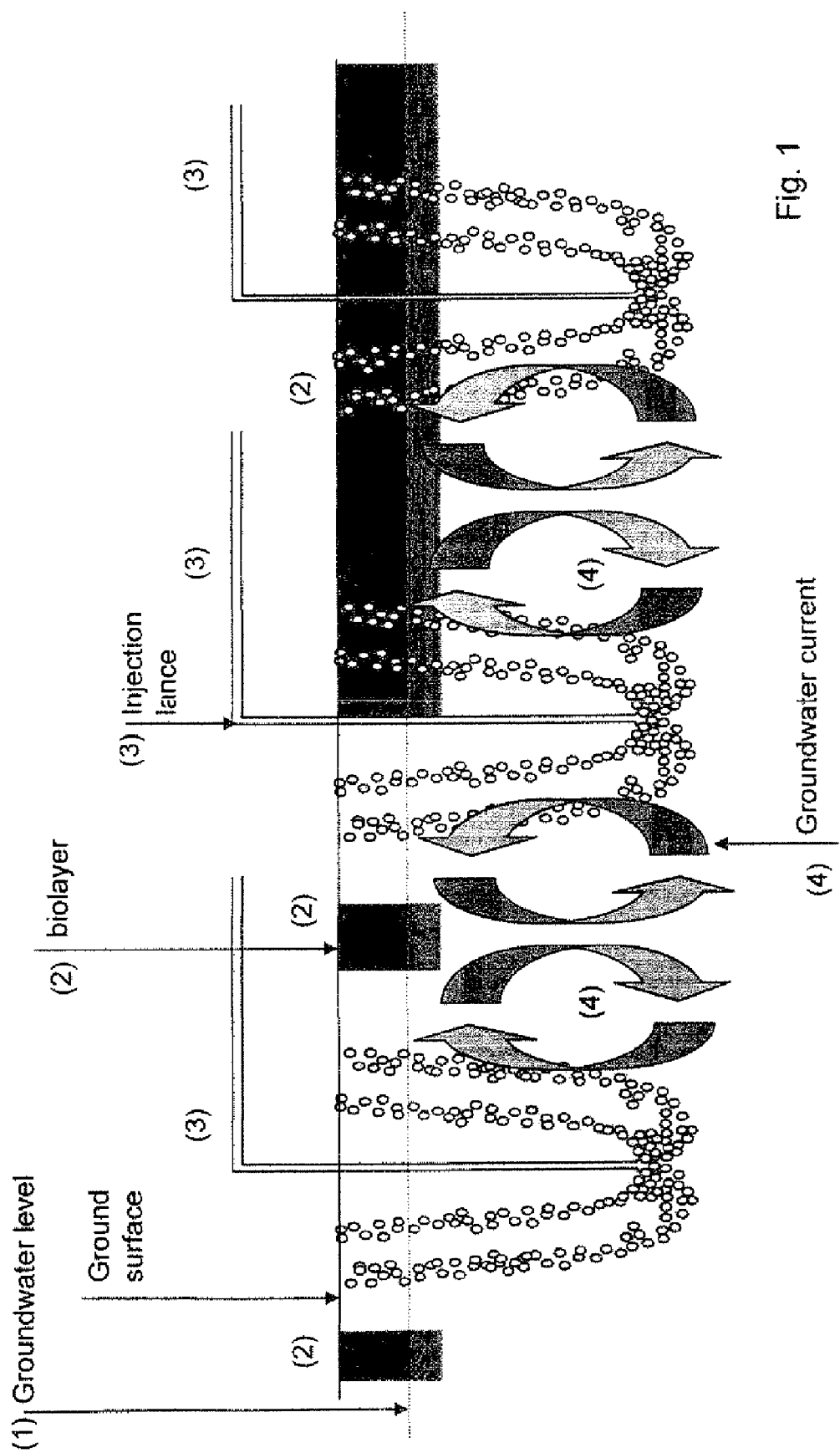
FIG. 1 is a schematic illustration of an embodiment wherein contaminated groundwater is contacted more than once with the biologically active layer with the aid of a gas.

In the context of the present invention, biologically active layer means a layer containing biologically active material. Biologically active material means a material that contains microorganisms whereby a contaminant can be decomposed or converted. The biologically active layer may be applied either continuously or discontinuously. With discontinuously is meant that the biologically active layer is applied discretely, i.e. in the form of discrete parts, which parts together form the biologically active layer. In one embodiment the biologically active layer is applied discontinuously. An example of a discontinuous layer is one comprising multiple trenches, which trenches may be the same or different in terms of shape and dimensions.

The combination of number, length, width and depth of the trenches will normally be so chosen that an optimum process is established.

Good contact between the contaminated groundwater and the biologically active layer is important, but the location of an area harbouring contaminated groundwater and above-ground conditions will also influence the shape and dimensions of the biologically active layer. When at least a part of the biologically active layer is introduced in the contaminated groundwater, then the contaminated groundwater is brought into contact with the biologically active layer, and the contaminated groundwater needs to be brought into motion only to a limited extent.

In an embodiment of the process the biologically active layer is placed so that direct contact is established between the biologically active layer and the groundwater. In an embodiment, this is achieved by creating a biologically active layer of such depth that the lower part of the layer is located in the groundwater.

However, it is also possible not to place the biologically active layer in direct contact with the groundwater. In such cases it is necessary for the contaminated groundwater to be actively contacted with the biologically active layer once or more often. In an embodiment of the process according to the invention contact between the contaminated groundwater and the biologically active layer is established by bringing the contaminated groundwater into or on top of the biologically active layer.

In a preferred embodiment the contaminated groundwater is contacted with the biologically active layer once or more often with the aid of a gas. In a more preferred embodiment the contaminated groundwater is repeatedly contacted with the biologically active layer with the aid of a gas. The gas is normally injected into the soil through one or more pipes into or beneath the contaminated groundwater. The one or more pipes are driven to a depth and are spaced apart at a distance to be determined by the nature of the subsoil and the horizontal and vertical extent of the contamination. The pipes may be perforated over a part of their length, for example over a length of 0.5-1.5 m. As the pipes are located a void may develop along the outside surface of the pipes in the soil. In order to prevent the gas injected in the pipes from immediately rising to the surface through such void, a gas impervious material, for example bentonite, is poured around the pipes. However, the entire underside of the pipe and the perforated part of the pipe, if present, must not be surrounded by gas impervious material. Where such pouring of the underside and the perforated part of the pipe is effected, use should be made of a gas pervious material such as sand.

On the surface, between and beside the injection pipes, a continuous or discontinuous bioactive layer is or has been prepared whose length and width are determined by the extent and the concentration of contamination and the depth by the groundwater level and the presence or absence of supernatant layers. By supplying air to the pipes at a high enough pressure the groundwater is brought into motion through the airlift principle to flow through the trenches containing the biologically active layer. The micro organisms in the biologically active layer ensure the desired conversion.

The principle of this process is schematically represented in FIG. 1. In FIG. 1 the dotted line (1) indicates the level to which groundwater is present is. The locations where a biologically active layer is present are marked by (2). The pipes through which a gas is injected into the soil are marked by (3). Such pipes are also known as injection lances. The curved arrows (4) schematically indicate how the groundwater circulates as a result of the air injected into the soil.

Aerobic conversion processes in the biologically active layer are promoted by establishing the contact between the biologically active layer and the contaminated groundwater with the aid of an oxygen-containing gas, or preferably a gas rich in oxygen.

Anaerobic conversion processes can be promoted by using a gas low in or devoid of oxygen.

Anaerobic and aerobic conversion processes can be effected in a biologically active layer by alternately using a gas low in or devoid of oxygen and a gas containing oxygen or preferably rich in oxygen. This is an advantage when for example a contaminant is first anaerobically converted into a compound that, although different, is still regarded as a contaminant, and the obtained anaerobic conversion products are subsequently aerobically converted into compounds that are not regarded as contaminants. Air is an example of a gas rich in oxygen.

In another embodiment, rather than with the aid of a gas, the contaminated groundwater is contacted with the biologically active layer by pumping the contaminated groundwater to the biologically active layer. It is also possible to inject a gas in combination with pumping contaminated groundwater so as to bring the contaminated groundwater in contact with the biologically active layer.

Each time the contaminated groundwater comes into contact with the biologically active layer, at least a proportion of the contaminant will be converted or decomposed. Depending on the concentration of the contaminant in the groundwater and the activity of the biologically active layer and the dimensions of the biologically active layer, the contaminated groundwater will need to be brought into contact with the biologically active layer once or more often in order to achieve the desired purity of the groundwater.

Preferably, the contaminated groundwater is contacted with the biologically active layer more than once.

In a preferred embodiment the contaminated groundwater is pumped away from the underside of the contaminated area with the aid of a pump and subsequently the contaminated groundwater is pumped into or onto the biologically active layer. Next, the contaminated groundwater descends through the biologically active layer. By continuously pumping water away from the contaminated area beneath the biologically active layer and pumping it into or onto the biologically active layer, a circulating water system is created, with the groundwater, so long as it still contains contaminants, being purified further each time it passes through the biologically active layer. Such circulation does not involve any large-scale extraction of groundwater from the soil. Any water emerging at the surface will be pumped immediately into the biologically active layer on or beneath the surface. Preferably, there are added to the pumped up contaminated water one or more substances that may be used by the microorganisms in the biologically active layer in order to convert the contaminant. An example of such a substance for aerobic conversions is oxygen. By preventing the supply of such substances from being subject to limitations, the conversion of the contaminant will continue to proceed optimally and the process according to the invention will usually have removed the desired amount of contaminants from the groundwater in a shorter period of time than without the substances added to the pumped-up water. The choice of a substance to be added is determined by the desired conversion. Where for example nitrate needs to be removed from groundwater, with the microorganisms in the biologically active layer causing the conversion to take place anaerobically, it is useful to add an organic carbon source to the pumped-up groundwater before it passes through the biologically active layer.

In a preferred embodiment the contaminated groundwater is contacted more than once with the biologically active layer with the aid of a gas. As a result of the air-lift principle injection of a gas will cause the contaminated groundwater to circulate. This is illustrated in FIG. 1. The advantage of the latter embodiment is that the gas to be injected contains substances or that substances may be added to the gas to be injected that are needed by microorganisms in the biologically active layer in order to convert the contaminant. An example of such a substance for aerobic conversion is oxygen. By preventing the supply of such substances from being subject to limitations, the conversion of the contaminant will continue to proceed optimally and the process according to the invention will usually have removed the desired amount of contaminants from the groundwater in a shorter period of time than without the substances present in or added to the gas. Yet another advantage of using a gas for contacting the contaminated groundwater with the biologically active layer is that any volatiles present may flow along with the gas to the biologically active layer. Thus, in the preferred embodiment in which the contaminated groundwater is contacted with the biologically active layer with the aid of a gas both volatile and water-soluble contaminants may be removed simultaneously.

The process according to the invention is suitable for removing any contaminant that dissolves in water. It is preferred for the contaminant to be removed by the process according to the invention to be readily soluble.

If a contaminant is readily soluble, the process will lead to the desired removal more rapidly than in the case of a less readily soluble contaminant. Unlike the known Pump and Treat process, the process according to the invention is also suitable for removing poorly soluble contaminants, albeit it will usually take more time to remove poorly soluble contaminants down to the desired level, because a poorly soluble contaminant is dissolved in the groundwater only in small amounts and hence only little will come into contact with the biologically active layer. However, by frequently contacting the contaminated groundwater containing a poorly soluble contaminant with a biologically active layer, it is well possible to remove such contaminants by the process according to the invention. In the context of the present invention, a poorly soluble compound is defined as a compound with a solubility of between one molucule/$m^3$ of groundwater and 10 grammes/$m^3$ of groundwater. All compounds with a solubility higher than 10 grammes/$m^3$ of groundwater are defined as readily soluble.

If the Pump and Treat process, where the contaminated water is pumped up and discharged, is used for removal of a poorly soluble contaminant, vast amounts of water will need to be extracted from the soil and discharged or reinfiltrated, with all attendant drawbacks.

In an embodiment of the process according to the invention, a detergent is added to the groundwater. In the context of the present invention, a detergent means any substance that promotes dissolution of the contaminant to be removed. Preferably a biologically degradable detergent is used. Preferably a detergent is used that adheres less well to the soil to be cleaned than to the contaminant to be removed. More preferably, the detergent does not adhere to or adheres only hardly to the soil to be cleaned. In a preferred embodiment of the process according to the invention cyclodextrines are used as the detergent. In another preferred embodiment, an electron acceptor is added during the process.

The process according to the invention is preferably applied for removing nitrogen-bearing contaminants such as $NH_3$. In a preferred embodiment the process according to the invention is characterized in that ammonia is nitrified to nitrate and subsequently nitrate is converted into $N_2$ through addition of a carbon-containing component.

A process wherein the wherein the contaminant is $NH_3$ may comprises the following steps:
  a) a biologically active layer is applied in or on the soil
  b) the contaminated groundwater is contacted under aerobic conditions with the biologically active layer whereby in the biologically active layer $NH_3$ is converted into $NO_3^-$
  c) step b) is repeated during a period of time that is needed to reduce the concentration of $NH_3$ to the desired level
  d) subsequently, the groundwater whose concentration of $NH_3$ has been reduced to the desired level is contacted with the biologically active layer under anaerobic conditions Step d) is repeated during the period of time that is needed to reduce the concentration of $NO_3^-$ to the desired level.

For the removal of nitrogen-bearing contaminants the process comprises a nitrification step that is followed by a denitrification step. In an embodiment first trenches are dug in which the biologically active layer is applied, and subsequently pipes are put in place with which air is injected in the soil beneath the contaminated groundwater, whereby the contaminated groundwater is brought into motion as a result of the air-lift principle and is thus also brought into contact with the biologically active layer. In the biologically active layer takes place the aerobic conversion of the nitrogen-bearing contaminant into nitrate, for example the conversion of $NH_3$ into $NO_3^-$, under the influence of microorganisms in the presence of air.

With the aid of the injected air the contaminated water is recirculated through the biologically active layer until the concentration of the nitrogen-bearing contaminant has fallen to the desired level. This nitrification step is followed by the denitrification step. In the denitrification step there is added to the nitrate-bearing groundwater an electron acceptor, e.g. in the form of an organic carbon source, in whose presence the conversion of nitrate into $N_2$ takes place in the biologically active layer. Preferred organic carbon sources to be used in the process according to the invention are methanol, acetic acid, lactate or molasses.

In an embodiment the denitrification process takes place by pumping up the nitrate-bearing groundwater through the pipes through which in the nitrification phase air was injected and adding the electron acceptor to the nitrate-bearing water aboveground, whereupon the nitrate-bearing water is pumped onto the biologically active layer, where the microorganisms, in the presence of the electron acceptor, cause the conversion of nitrate into $N_2$ to take place. This embodiment is illustrated by FIG. 2. In FIG. 2 the dotted line (1) indicates the groundwater level, the locations where a biologically active layer is present are marked by (2). Groundwater to which an electron acceptor is added is injected through pipe (3). Nitrate-bearing groundwater is extracted from the soil through pipes (4). The pump is schematically depicted at (5), and (6) indicates the point where the electron acceptor is added to the groundwater.

An advantage of adding the electron acceptor to pumped-up groundwater is that the pumping up of groundwater makes it possible to easily determine the nitrate concentration, whereupon the dosing rate of the electron acceptor may be adjusted thereto. However, it is also well possible to contact the nitrate-bearing groundwater again with the biologically active layer with the aid of a gas through the air lift principle and to add a volatile electron acceptor to the gas so that the entire process can take place in the soil. In both embodiments the removal of the nitrogen-laden contaminant takes place in situ, because the conversion of the contaminant is effected in the biologically active layer applied in or on the soil.

The invention claimed is:

1. Process for removing a contaminant from contaminated groundwater comprising the steps of:
  a) contacting a surface region of soil with a biologically active material to form a biologically active layer on or in the soil surface region such that at least an upper part of the biologically active layer is located above a level of contaminated groundwater in the soil; and
  b) causing the contaminated groundwater to contact the biologically active material in the biologically active layer with the aid of a gas and/or by pumping to thereby remove the contaminant from the contaminated groundwater.

2. Process according to claim 1, wherein step a) includes contacting the soil surface with the biologically active material so as to form a discontinuous biologically active layer.

3. Process according to claim 1, wherein step a) includes forming the biologically active layer to a depth in the soil surface region such that a lower part of the biologically active layer is in contact with the groundwater.

4. Process according to claim 1, wherein step b) includes causing the contaminated groundwater to be brought into or on top of the biologically active layer.

5. Process according to claim 1, wherein step b) includes causing the contaminated groundwater to be brought into contact with the biologically active layer more than once.

6. Process according to claim 1, wherein the contaminant is readily soluble.

7. Process according to claim 1, further comprising the step of adding an electron acceptor to the contaminated groundwater.

8. Process according to claim 1, wherein ammonia is the contaminant in the groundwater, and wherein the process comprises nitrifying the ammonia contaminant to nitrate and subsequently converting the nitrate into $N_2$ through addition of a carbon-containing component.

9. Process for removing a contaminant from contaminated groundwater, wherein the contaminant is $NH_3$ and wherein the process comprises the following steps:
  a) a biologically active layer is applied in or on the soil;
  b) the contaminated groundwater is contacted under aerobic conditions with the biologically active layer whereby in the biologically active layer $NH_3$ is converted into $NO_3$:

c) step b) is repeated during a period of time that is needed to reduce the concentration of $NH_3$ to the desired level:
d) subsequently, the groundwater whose concentration of $NH_3$ has been reduced to the desired level is contacted with the biologically active layer under anaerobic conditions; and
e) step d) is repeated during the period of time that is needed to reduce the concentration of $NO_3$ to the desired level.

10. Process according to claim 1, wherein a detergent is added.

11. Process according to claim 1, wherein step a) includes forming trenches in the soil surface region, and placing the biologically active material in the trenches.

12. Process according to claim 11, wherein the trenches are discontinuous.

* * * * *